Figure 1:
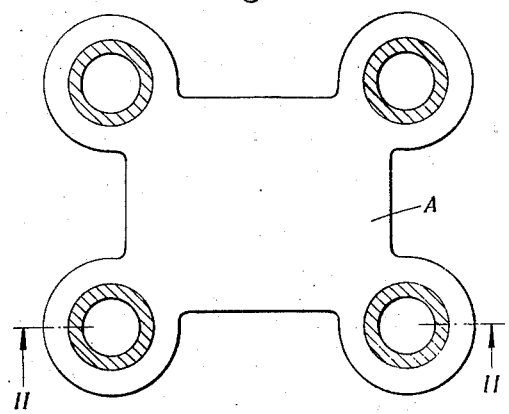

July 14, 1942.   R. E. REASON   2,289,551
APPARATUS FOR MEASURING RELATIVE MOVEMENTS OR DEFLECTIONS OF
ASSOCIATED OR INTERCONNECTED PARTS
Filed Dec. 11, 1940.   9 Sheets-Sheet 1

INVENTOR
R.E.REASON
BY Blair + Kilcoyne
ATTORNEYS

July 14, 1942.    R. E. REASON    2,289,551
APPARATUS FOR MEASURING RELATIVE MOVEMENTS OR DEFLECTIONS OF ASSOCIATED OR INTERCONNECTED PARTS
Filed Dec. 11, 1940    9 Sheets-Sheet 2

INVENTOR
R.E. REASON
BY Blair + Kilcoyne
ATTORNEYS

July 14, 1942.  R. E. REASON  2,289,551
APPARATUS FOR MEASURING RELATIVE MOVEMENTS OR DEFLECTIONS OF
ASSOCIATED OR INTERCONNECTED PARTS
Filed Dec. 11, 1940  9 Sheets-Sheet 3
*Fig. 4.*
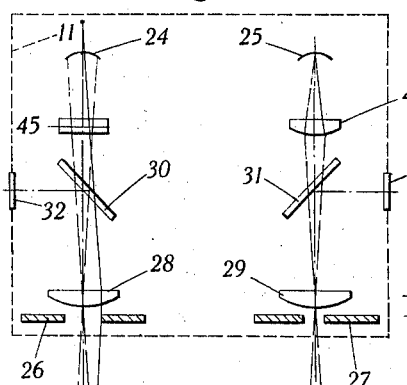
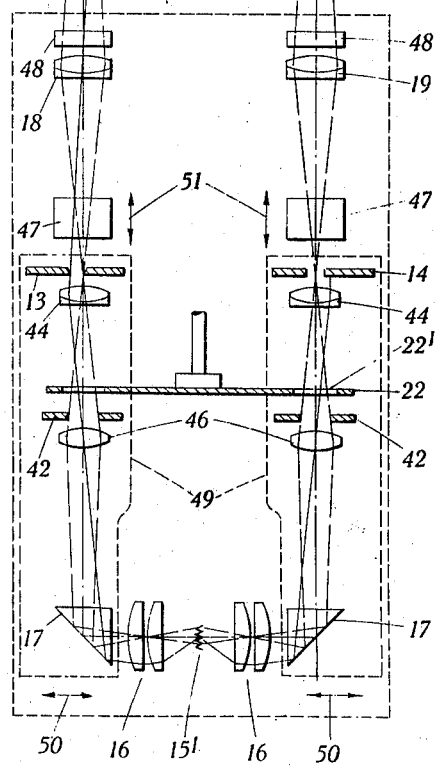
*Fig. 16.*
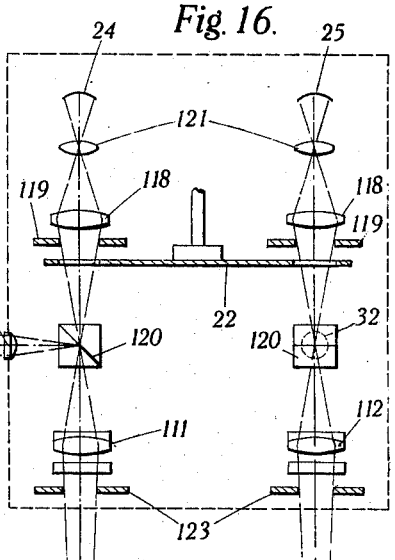
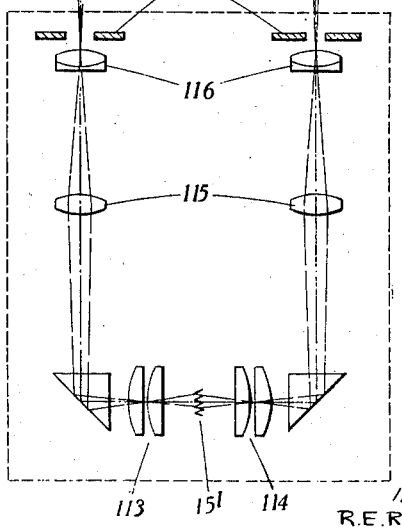
INVENTOR
R.E. REASON
BY Blair + Kilcoyne
ATTORNEYS July 14, 1942.　　　　R. E. REASON　　　　2,289,551
APPARATUS FOR MEASURING RELATIVE MOVEMENTS OR DEFLECTIONS OF
ASSOCIATED OR INTERCONNECTED PARTS
Filed Dec. 11, 1940　　　　9 Sheets-Sheet 5

INVENTOR
R. E. REASON
BY Blair + Kilcoyne
ATTORNEYS

July 14, 1942.  R. E. REASON  2,289,551
APPARATUS FOR MEASURING RELATIVE MOVEMENTS OR DEFLECTIONS OF
ASSOCIATED OR INTERCONNECTED PARTS
Filed Dec. 11, 1940   9 Sheets-Sheet 6
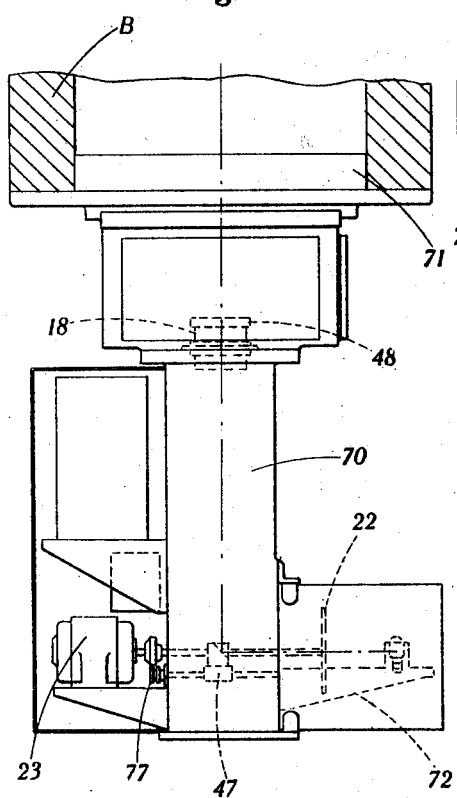
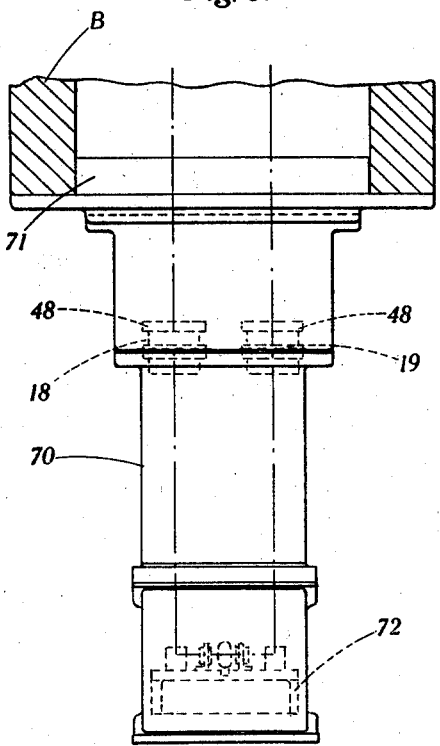
INVENTOR
R.E.REASON
BY Blain+Kilcoyne
ATTORNEYS July 14, 1942.    R. E. REASON    2,289,551
APPARATUS FOR MEASURING RELATIVE MOVEMENTS OR DEFLECTIONS OF
ASSOCIATED OR INTERCONNECTED PARTS
Filed Dec. 11, 1940    9 Sheets-Sheet 7

INVENTOR
R.E. REASON
BY Blair & Kilcoyne
ATTORNEYS

July 14, 1942. R. E. REASON 2,289,551
APPARATUS FOR MEASURING RELATIVE MOVEMENTS OR DEFLECTIONS OF
ASSOCIATED OR INTERCONNECTED PARTS
Filed Dec. 11, 1940 9 Sheets-Sheet 8
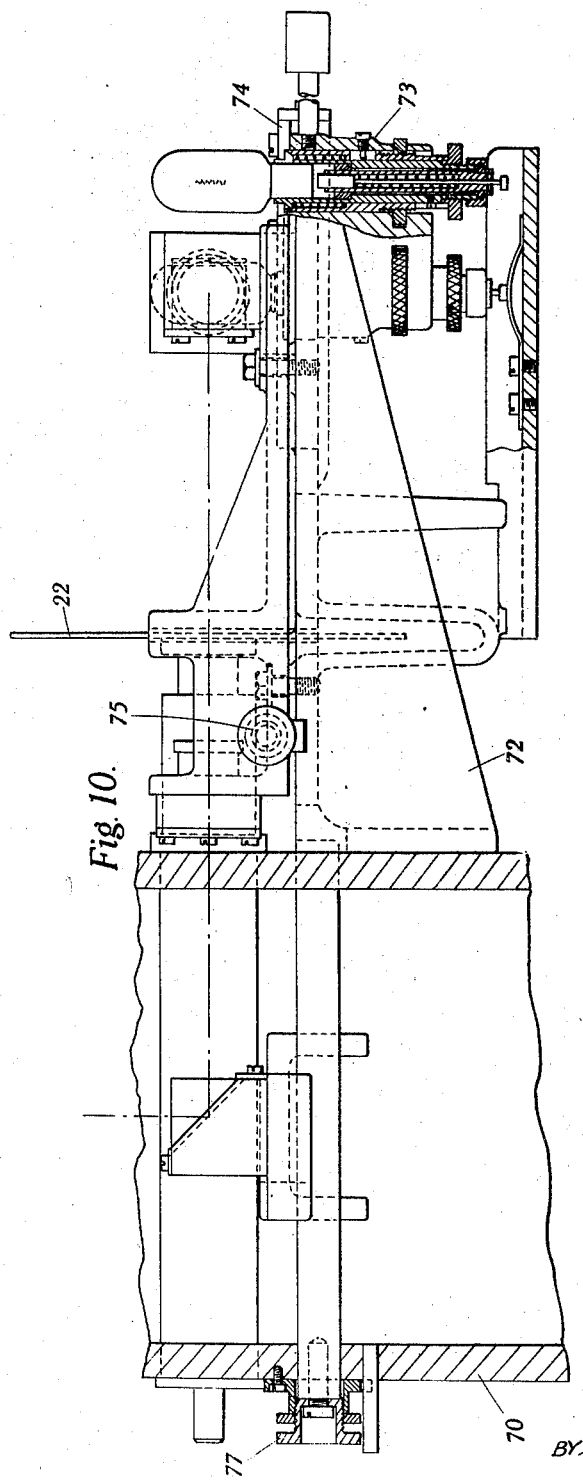
INVENTOR
R. E. REASON
BY Blair & Kilcoyn
ATTORNEYS July 14, 1942.　　　R. E. REASON　　　2,289,551
APPARATUS FOR MEASURING RELATIVE MOVEMENTS OR DEFLECTIONS OF
ASSOCIATED OR INTERCONNECTED PARTS
Filed Dec. 11, 1940　　　9 Sheets-Sheet 9
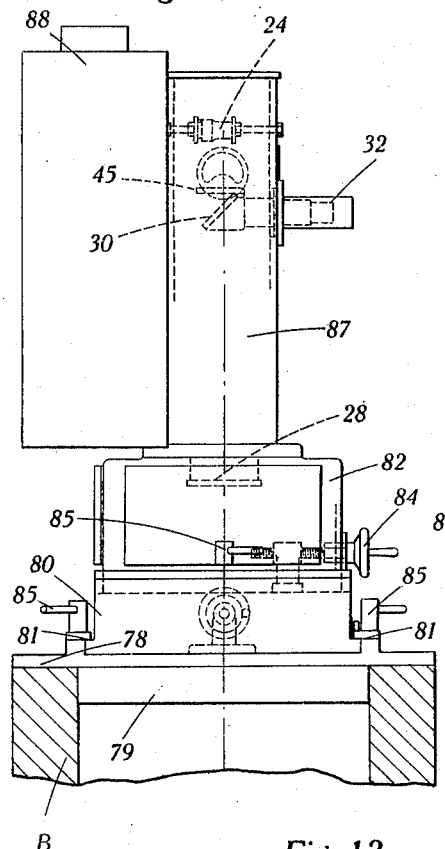
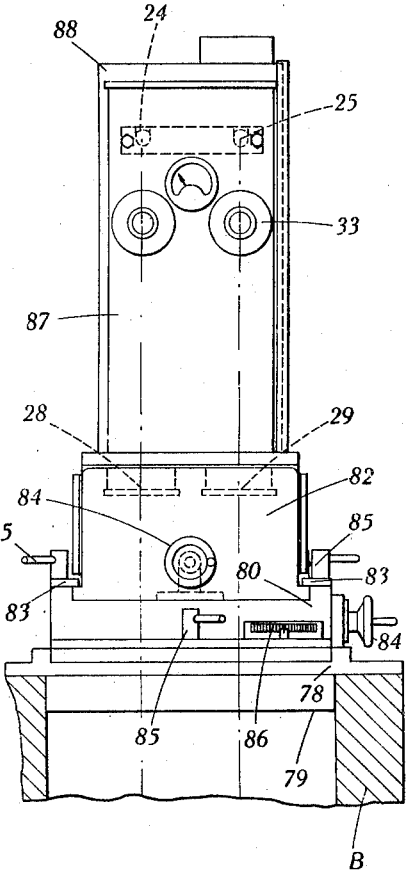
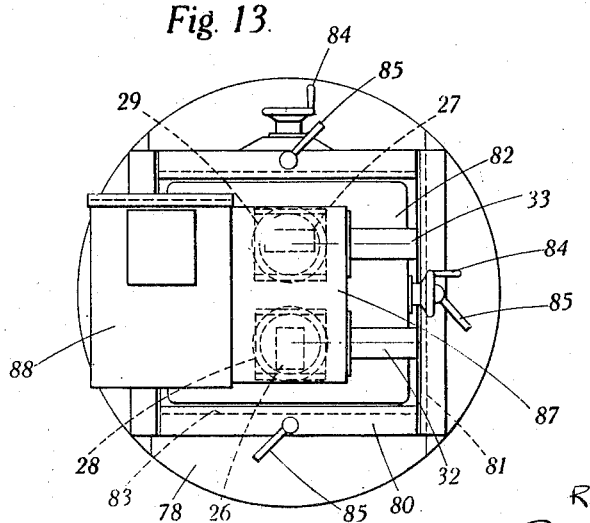
INVENTOR
R.E. REASON
Blair + Kilcoyne
ATTORNEYS

Patented July 14, 1942

2,289,551

UNITED STATES PATENT OFFICE 2,289,551

APPARATUS FOR MEASURING RELATIVE MOVEMENTS OR DEFLECTIONS OF ASSOCIATED OR INTERCONNECTED PARTS

Richard Edmund Reason, Leicester, England, assignor to Kapella Limited, Leicester, England, a company of Great Britain, and Davy & United Engineering Company Limited, Yorkshire, England, a company of Great Britain Application December 11, 1940, Serial No. 369,680
In Great Britain December 18, 1939

38 Claims. (Cl. 177—351)

This invention relates to apparatus for measuring relative lateral movements or deflections of two associated or interconnected parts, such for example as the upper and lower parts of a reciprocating press.

Apparatus according to the invention comprises in combination two pairs of elements one of each pair being constituted by a knife-edge and the other by an aperture, means for projecting an image of one element of each pair on to the other element of the same pair, two photoelectric cells respectively associated with the two pairs of elements, and measuring means controlled by the cells, the arrangement being such that relative movement of the two associated parts in either of two coordinate directions causes corresponding relative movement of the two elements of one pair so as to vary the light incident on the corresponding cell whereby the two cells are energised respectively in accordance with relative movement of the two associated parts in the two coordinate directions.

The two knife-edges may be constituted by two mutually perpendicular edges of two masking openings both of which may be arranged on one of the said two associated parts, the optical projection means projecting images of the knife-edges respectively across the two associated apertures. In an alternative arrangement the two knife-edges are constituted by two mutually perpendicular edges of a single masking opening on one of the two associated parts, the optical projection means projecting images of the knife-edges respectively across the associated apertures on the other part. The two knife-edges are conveniently relatively adjustable in two mutually perpendicular directions and each knife-edge may be furnished with a notch or opening which, as reproduced in the projected image, serves as a datum for positioning the knife-edge images relatively to the associated apertures. To facilitate this adjustment each aperture may be provided with a pointer or index constituted by, or extending into, an opening adjacent to one edge of the aperture.

A semi-transparent, or partly transparent and partly reflecting, mirror may be arranged between each photoelectric cell and the associated projection objective or objectives, the mirror reflecting part of the light transversely to means, such for example as a microscope, for observing the transmitted light image. In one arrangement the two apertures are carried by one of the two associated parts and the optical projection means projects images of the apertures respectively across the two knife-edges carried by the other part, the knife edges conveniently being constituted by the junction between the reflecting and transmitting parts of the said mirror.

The outputs of the photoelectric cells may be applied to two measuring instruments respectively or they may be superimposed on one and the same measuring instrument. For example the said two outputs may respectively control the pointers of two indicators whose scales are graduated in two mutually perpendicular directions. Preferably, however, the two cells are respectively connected to the associated measuring device or devices through amplifiers, a light interrupter or light chopper being provided for effecting sinusoidal interruption of the light incident on each cell. The sinusoidal light interruption is conveniently effected in or near the image plane of the corresponding projection objective or the interrupter is imaged in or near the plane of the objective.

In one arrangement the light interrupter and the projection objectives are arranged on one of the two associated parts and the photoelectric cells on the second part, a cylindrical lens being provided on the second part in the light beam incident on each cell so as to maintain substantially constant the position of the patch of light on the cell irrespective of relative movements of the two associated parts. In another arrangement the projection objectives and the light interrupter are arranged on the part which carries the cells, the arrangement being such that the size and position of the patch of light on the cell will be maintained substantially constant irrespective of relative movements of the two associated parts.

The outputs of the photoelectric cells may be applied to control an alarm and/or safety device so that a predetermined degree of lateral relative displacement or deflection of the two associated parts will automatically cause operation of the alarm or safety device. Preferably the alarm or safety device is controlled through a system of relays whose characteristics are such that the magnitude of the relative movement or deflection necessary to operate the alarm or safety device is approximately the same whatever the direction of the said movement or deflection. To this end two alarm control relays may be connected across the output sides of two amplifiers connected to the photoelectric cells respectively, a third alarm relay being connected between corresponding terminals of the first two relays which have their other terminals connected together, the impedance of the third relay being, say, twice that of each of the first and second relays.

Figure 2:
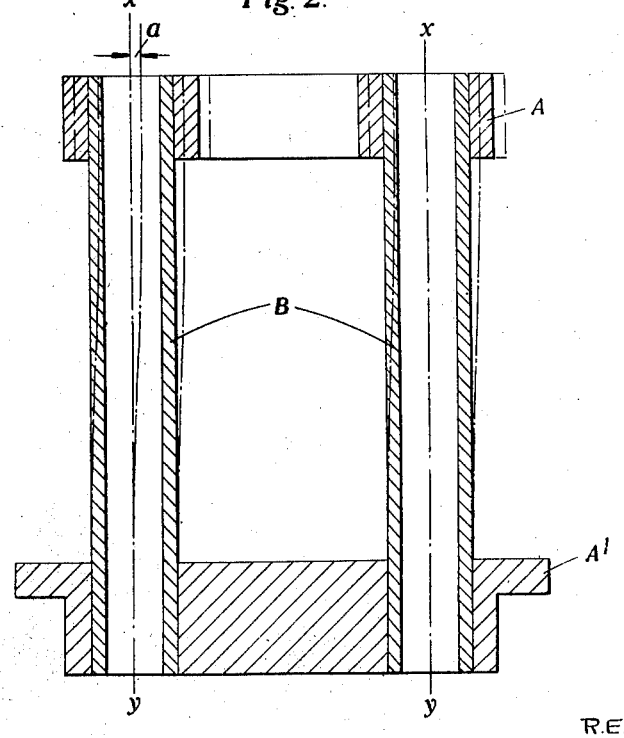
Figure 3:
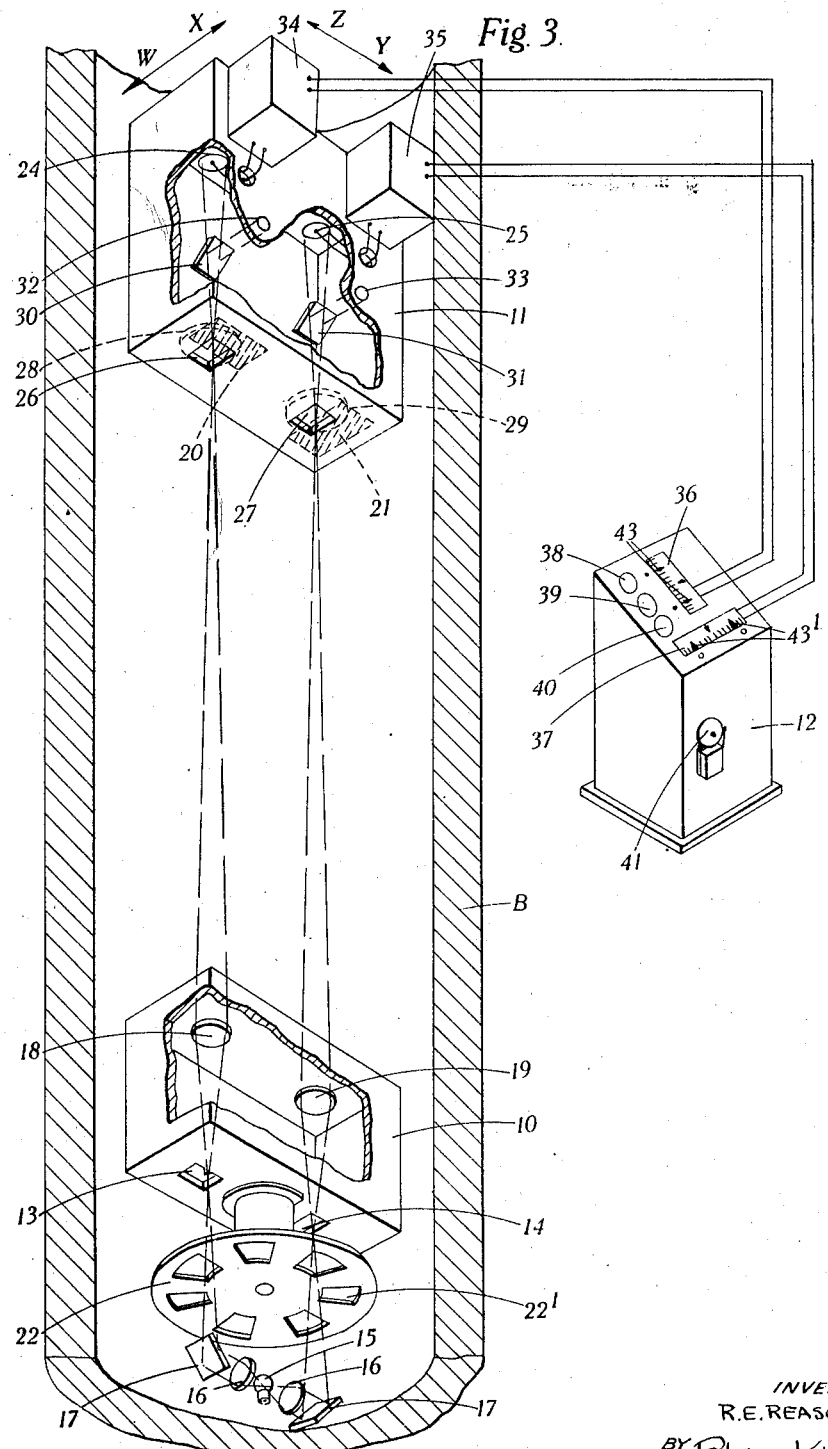

In the accompanying drawings:

Figure 1 shows diagrammatically and in horizontal plan a conventional arrangement of the four pillars of a vertical reciprocating press to which the invention may be applied, Figure 2 is a vertical section on the line II—II of Figure 1, Figure 3 illustrates diagrammatically one arrangement of measuring apparatus according to the invention as applied to one of the pillars of a press as shown in Figures 1 and 2.

Figure 5:
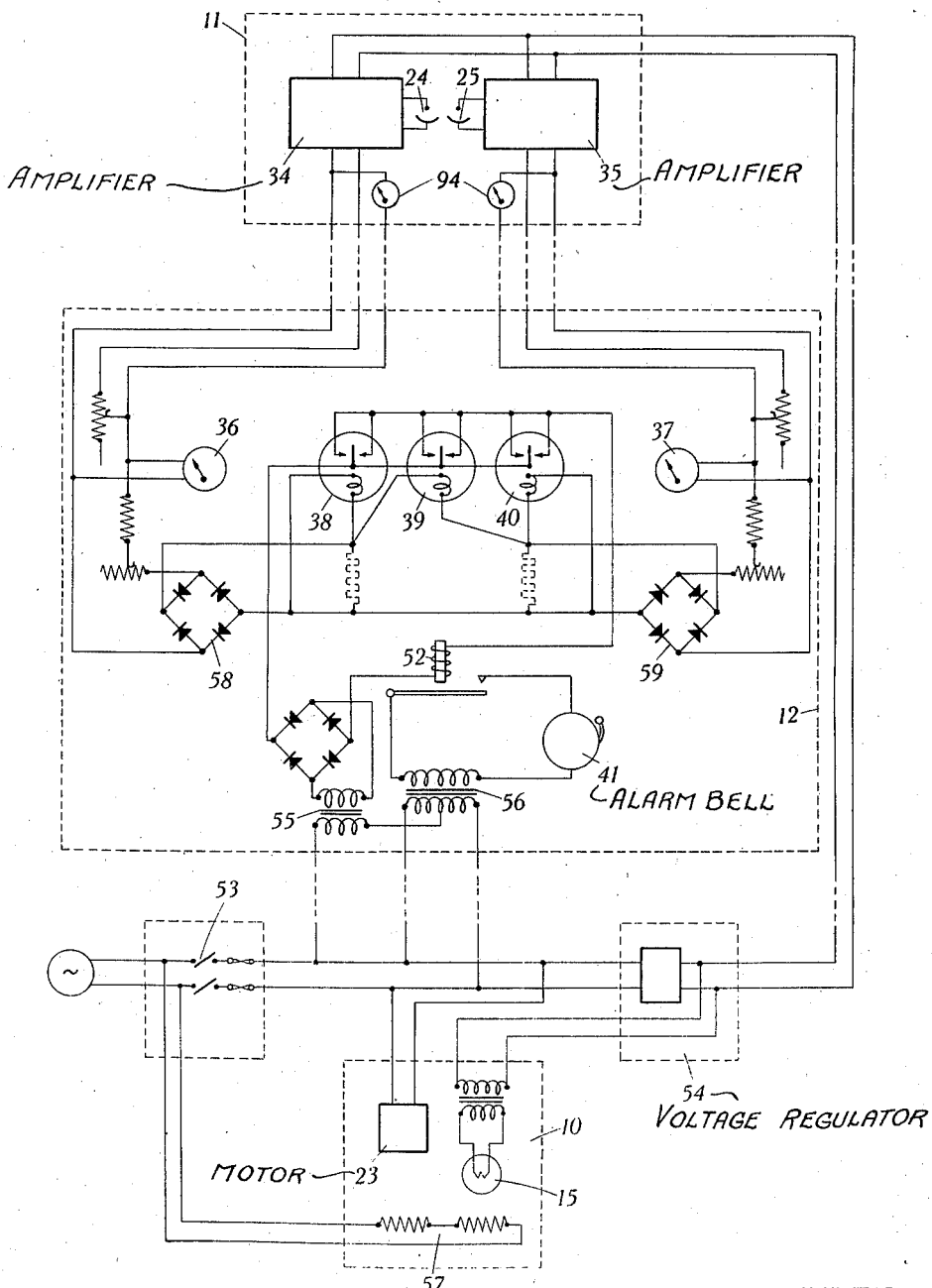
Figure 6:
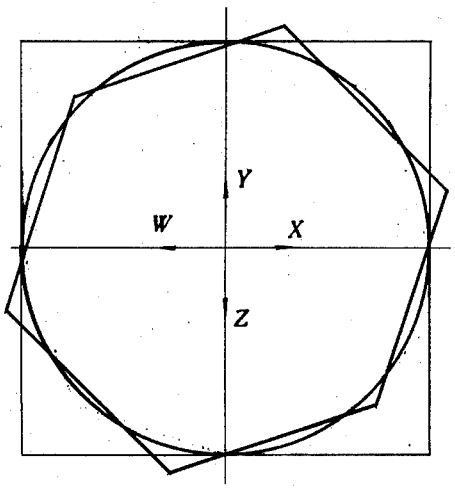
Figure 15:
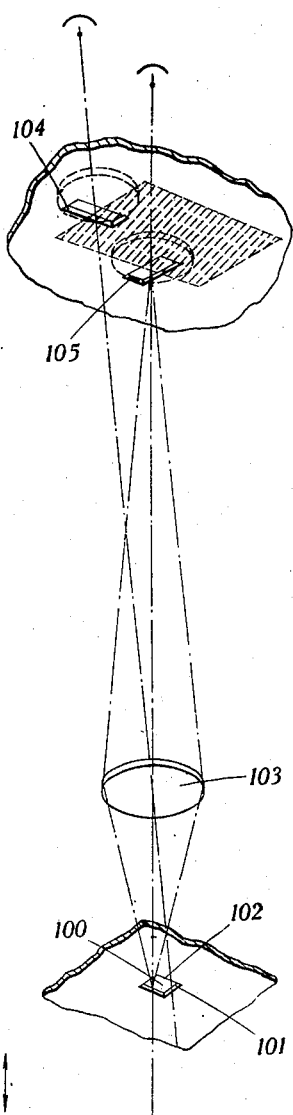
Figure 14:
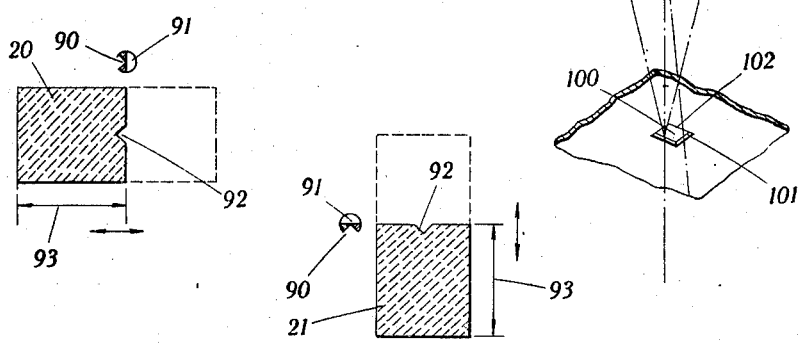
Figure 9:
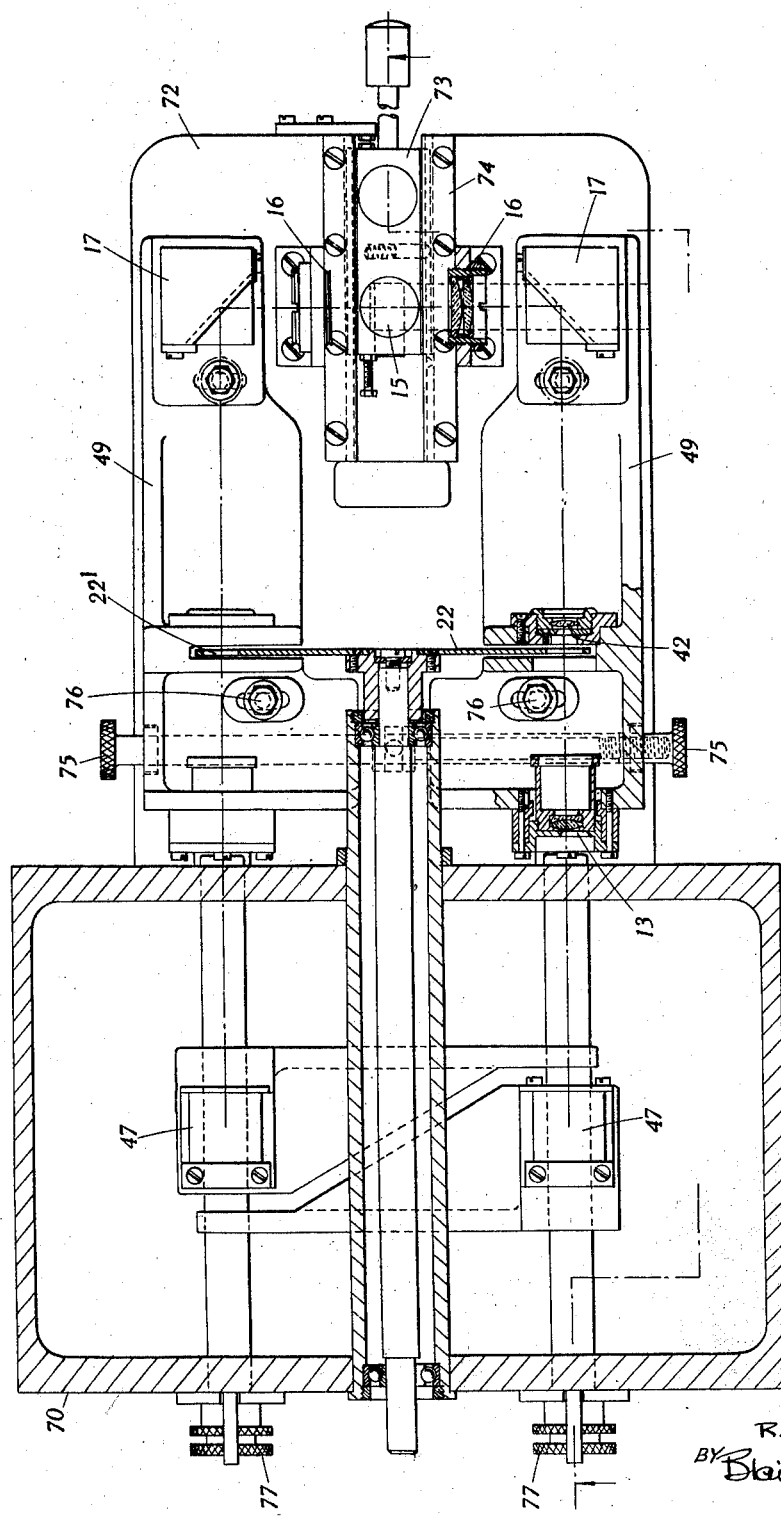

Figure 4 is a diagrammatic representation of the optical system according to Figure 3, Figure 5 indicates diagrammatically the electrical circuits including that for an alarm bell, Figure 6 is a diagram indicating the approximately circular field of a control obtained with the alarm circuit included in Figure 5, Figure 7 shows one form of lower or projector unit in side elevation, part of the press pillar being shown in vertical section, Figure 8 is a view at right angles to that of Figure 7, Figure 9 shows the lower unit in plan and on a larger scale, Figure 10 illustrates the lower unit in side elevation and on the same scale as Figure 9, Figure 11 shows the upper or receiver unit in side elevation with part of the press pillar in section, Figure 12 is a view at right angles to that of Figure 11, Figure 13 illustrates the upper unit in plan, Figure 14 shows on an enlarged scale the means for facilitating initial centralisation of the projected light images, Figure 15 is a diagram of an arrangement alternative to that of Figure 4, and Figure 16 shows yet a further optical system which may be employed.

When applied to a reciprocating press as shown in Figures 1 and 2 the apparatus according to the invention, and as hereinafter described, indicates the amount by which the head A of the press is deflected relatively to the base $A^1$, and gives audible warning when the deflection reaches a predetermined magnitude. Thus, the quantity to be measured is the offset $a$ of the head A measured from the normal axis $x, y$ of the column B.

As shown diagrammatically in Figure 3 the apparatus comprises a lower or projector unit 10 arranged within the lower end of one of the four pillars B of the press, an upper or receiver unit 11 arranged within the upper end of the said hollow pillar, and means whereby any transverse deflection of the upper or receiver unit 11 relatively to the lower or projector unit 10 is determined and indicated, the quantity indicated corresponding to the deflection of the head A of the press from the normal axis $x, y$ of the hollow pillar B. A third unit, constituted by a control desk 12, is arranged on the operating platform of the press and indicates the deflections of the head A of the press relatively to the base $A^1$.

The lower or projector unit 10 comprises two apertures 13, 14 the whole area of each of which is uniformly illuminated by a lamp 15 the light from which is directed through two condensers 16 to mirrors 17. Two projection objectives 18, 19 project enlarged images 20, 21 of the apertures 13, 14 on to the upper unit 11. Thus, from each objective 18, 19 there emerges a beam of light whose boundaries at the upper unit 11 are defined by the sides of the enlarged image of the aperture 13 or 14. The lower or projector unit 10 also includes a chopper or light interrupter 22 driven by an electric motor 23, for periodically interrupting the light at a frequency, say 1000 cycles per second, which is suitable for electrical amplification of the output of photo-electric cells 24, 25 included in the upper or receiving unit 11.

The receiving unit 11 comprises two receiving apertures 26, 27 and two condensers 28, 29 which direct the light passing through them on to the photo-electric cells 24, 25 respectively. Two transparent reflectors 30, 31 deflect a small part of the light to two eyepieces 32, 33 through which the alignment can be visually inspected for initial setting up and periodic checking, as will be described hereinafter in further detail. The outputs of the two photo-electric cells are amplified by two thermionic amplifiers 34, 35.

The control desk 12 comprises two voltmeters whose scales 36, 37 are arranged at right angles to each other, and three relays 38, 39 and 40 which control an alarm bell 41 to give audible warning when the deflection reaches a predetermined magnitude.

The apparatus is initially adjusted so that in the no-deflection position the projected images 20, 21 of the apertures 13, 14 illuminate (nominally) half the area of each of the apertures 26, 27, and the amplification of the amplifiers 34, 35 is then adjusted so that the pointers of the two voltmeters are deflected to the centres of the two scales 36, 37 which positions are marked zero. After the initial setting the whole of the optical system is firmly locked in position. Since the light beams from the two projection objectives 18, 19 remain fixed in direction relatively to the lower unit and hence relatively to the base $A^1$ of the press, the images 20, 21 will, in effect, define the axis $x, y$ at the head A of the press. If now the head A, carrying with it the upper unit 11, moves, say, in the direction X, the aperture 26 will be moved further into the light beam projected from the objective 18 so that more light will pass through to the photo-electric cell 24 and the pointer of the voltmeter 36 will move in the corresponding direction through a proportional distance. Similarly if the head A moves in the direction W the aperture 26 moves further out of the illuminated area 20 so that less light will pass to the photo-electric cell 24 and the pointer of the corresponding voltmeter 36 will move accordingly. For movement only in the coordinate direction W or X the illuminated area of the aperture 27 will remain constant since the motion is in either case parallel to the functional edge of the image 21.

Similarly, movement of the head A carrying the unit 11 in either of the coordinate directions Y or Z will result in corresponding movement of the pointer of the voltmeter 37 to one side or the other of the zero, the illuminated area of the aperture 26 remaining constant since the movement is parallel to the functional edge of the image 20. Given a sufficiently large movement of the head A the aperture 26 or 27 would pass out of the illuminated image 20 or 21 and the meter reading would be incorrect. The deflection necessary for these conditions to arise is, however, well outside the permissible range of deflection.

For reasons connected with the uneven brightness of the filament of the lamp 15, and with the desirability of producing a reasonably sinusoidal wave form with the interrupter disc 22, the simple illuminator shown for convenience in Figure 3 is not wholly satisfactory in practice and a preferred system is shown diagrammatically in Figure 4. In this arrangement an image of the lamp filament $15^1$ is formed in each of the sinusoidally shaped apertures 42 and images of the apertures 42, 43 are formed near the projection objectives 18, 19 by means of two lenses 44 respectively. An image of each condenser 16 is formed on the corresponding aperture 13 or 14 by means of the associated lens 46. The straight-sided apertures $22^1$ of the interrupter disc 22 traversing each sinusoidal aperture 42 produce a substantially sinusoidal wave form for the projected light. As will be more apparent when the apparatus is more fully described hereinafter, the optical axes are horizontal from the filament $15^1$ to the apertures 13, 14 after which the axes are deflected into the vertical, i. e. within the pillar B and parallel to the longitudinal axis thereof, by prisms 47 towards the unit 11 at the upper end of the column. Each projection objective 18 or 19 is furnished with a protective cover 48 of parallel glass mounted in a cell which can be detached from the objective for replacement.

In order to permit initial adjustment of each of the images 20, 21 for setting the apparatus to zero or "no deflection," the components 17, 46, 42, 44 and 13 (or 14) of each group are mounted on a slide 49 which can be adjusted in the direction of the arrows 50, whilst each of the prisms 47 are adjustable in the directions of the arrows 51. Similarly for testing the performance the upper unit 11 is adjustable horizontally in two coordinate directions, as fully described below, to simulate artificially deflections of the head A.

Assuming that the apparatus has been initially set to the "no deflection" position, the scales 36, 37 on the voltmeter will continue to read zero during operation of the press provided that the guide or pillar B is not deflected due, for example, to an unevenly distributed load on the press. If such deflection of the pillar B does occur, corresponding relative deflection of the projector and receiver units 10 and 11 will take place. If this lateral deflection is only in the direction of the length of one knife-edge image 20 or 21 extending across one of the receiving apertures 26 or 27, i. e. parallel to one meridian, the quantity of light passing through this aperture will not change but such displacement will result in the knife-edge image which extends across the other receiving aperture (and parallel to the second meridian) moving in a direction normal to the length of such edge so that the quantity of light passing through this second receiving aperture will be increased or decreased and a corresponding reading will be shown on the associated scale of the voltmeter. Should the deflection of the pillar B be in a direction which is inclined to both the knife-edge images 20 and 21 extending across the receiving apertures 26 and 27, that is to say so that a vector representing the deflection in magnitude and direction lies between the two meridians, the quantity of light passing through each of the receiving apertures 26 and 27 will be altered. The deflections will be indicated respectively on the two voltmeter scales 36 and 37 so that the operator can stop the press and rearrange the work with a view to correcting the unequal distribution of load which has resulted in the deflection.

The arrangement is such that when a predetermined maximum permissible deflection, shown by adjustable red index marks 43 and $43^1$, takes place the alarm bell 41 is automatically rung. With this arrangement, however, the degree of deflection necessary to cause operation of the alarm will increase as the vector representing the deflection in magnitude and direction approaches a position mid-way between the two meridians, that is to say, the control will cover a square field and the alarm will not be operated at the same magnitude of deflection for all directions thereof. For example, the head A of the press may be deflected at 45° to the two meridians so that a deflection will be indicated on each of the voltmeter scales 36, 37. If both the voltmeter pointers are to be deflected to their maximum indexes the necessary deflection of the head A of the press would be 1.4 times the amount shown on the scales by the index marks 43 or $43^1$, i. e. an amount considerably in excess of the permitted tolerance. With a view to overcoming this difficulty the alarm bell is controlled by the three relays 38, 39 and 40. To this end, as shown diagrammatically in Figure 5, the control desk 12 includes a bell relay 52 controlled by the relays 38, 39 and 40, the lamp 15 and amplifiers 34, 35 being supplied through a double pole main switch 53 and voltage regulating transformer 54. The relays 38, 39 and 40 as also the bell relay 52 are supplied from a transformer 55 whilst the bell 41 is supplied from a transformer 56. A heater 57, wired up for continuous operation, maintains the lower unit 10 a few degrees above atmospheric temperature thereby preventing condensation on the lenses of the lower unit whilst the press is in operation.

The relays 38 and 40 are connected across the output sides of two rectifier bridges 58, 59 associated with the two amplifiers 34, 35 respectively, whilst the third or central relay 39 is connected between corresponding ends of the relays 38, 40. By suitably determining the characteristics of the three relays 38, 39, 40 the control of the alarm bell will be such that the degree of deflection necessary to cause operation of the alarm is approximately the same for all directions of deflection, that is to say the length of the vector representing, in magnitude and direction, the deflection necessary to operate the alarm will be approximately the same for a deflection mid-way between the two meridians as at the meridians themselves. For example, if the central relay 39 is given an impedance twice that of each of the other two lateral relays 38, 40 the alarm control will be effected over a six-sided field as shown in Figure 6 which forms a reasonably close approximation to a circle. The use of more than three relays, for example five relays, which would give a decagon, would result in a closer approximation to a circle. Thus, when there is no deflection the relay 38 connected across the amplifier 34 will pass three quarters of the current from that amplifier and one quarter of the current from the second amplifier 35. Similarly, the relay 40 connected across the second amplifier 35 will pass three quarters of the current from that amplifier and one quarter of the current from the first amplifier 34. The current through each of the two lateral relays 38 and 40 connected across the amplifiers respectively is thus equal to that from each amplifier. The third or central relay 39 has a centre zero and, since it is connected to points in the circuit which are, under these conditions, equipotential, will not be deflected. Each of the two lateral relays 38 and 40 is adjusted to give a predetermined reading, say half the full scale, when the pointers of the voltmeters 36, 37 read zero as will be the case with no deflection of the press.

Assuming now that the press is deflected in the direction of one meridian X so that the output from the first amplifier 34 is increased, all three relays 38, 39 and 40 will commence to deflect but the deflection of the first lateral relay 38 will be the greatest and, at maximum deflection on the said meridian to one side or the other of a zero position, this relay will close the circuit through a rectifier 60 and the relay 52 for controlling the bell 41. The same result will be obtained by means of the second lateral relay 40 when the output of the second amplifier 35 is increased due to maximum deflection, on one side or the other of a mean value, along the second meridian Y. If, starting with no deflection, the output of the first amplifier 34 is increased to a value corresponding to ¾ of the maximum deflection, and the output of the second amplifier 35 then begins to increase, part of the current from the second amplifier 35 will pass through and continue to deflect the first relay 38 and both the first and second relays 38 and 40 will operate their contacts when the outputs of the first and second amplifiers 34 and 35 have both increased (or both decreased) to a value corresponding to ¾ of the maximum deflection, that is to say when the resultant deflection only exceeds the predetermined maximum by 10%. Now, starting again from conditions of no deflection, assume that the output of the first amplifier 34 is increased to a value corresponding to, say, ¾ of the maximum deflection but that the output of the second amplifier 35 is decreased. The deflections of the first and second relays 38 and 40 will be reduced and their contacts will not be closed, but there is now a difference of potential across the third or central relay 39 whose contacts will close to actuate the alarm bell 41. Thus, whatever the direction of the deflection, the magnitude thereof necessary to operate the alarm bell will be approximately the same in accordance with the six-sided field shown in Figure 6.

If desired, instead of making the impedance of the relay 39 different from that of each of the relays 38, 40, the necessary 2:1 or other impedance ratio may be obtained by shunting each of the relays 38 and 40 by a resistance, as shown dotted in Figure 5.

The mechanical details of the apparatus are shown in somewhat more detail in Figures 7 to 13. As shown in Figures 7 and 8, the lower or projector unit 10 comprises a casing 70 furnished with an annular flange 71 adapted to fit within the hollow pillar B and carrying the two projection lenses 18, 19 whose axes are vertical and laterally spaced apart, each projection lens having the parallel glass cover 48 for purposes of protection. The casing 70 has a transverse frame or bracket 72 which extends horizontally when the casing 70 is in position, as shown in Figure 7, and a carrier 73 (Figures 9 and 10), movable on guides 74 carried by the horizontal bracket 72, supports the electric lamp 15, the carrier 73 and lamp 15 being thus movable horizontally for positioning the lamp. When in position the lamp 15 lies between the two condenser lenses 16 through each of which light is transmitted horizontally from the lamp 15 to the two prisms or mirrors 17 each carried at one end of the corresponding adjustable frame 49. The two supporting frames 49 are laterally adjustable towards and away from each other by means of thumb screws 75 and nuts 76 are provided whereby they can be locked in the position of adjustment. In addition to the deflecting devices 17, each of the two supporting frames 49 carries the shaped window 42 for cooperation with the rotary light interrupter or chopper 22 as hereinafter described, the masking opening 13 (or 14) and the lenses for imaging the lamp filament on the shaped window 42 and for imaging this window on the associated projection lens 18 or 19 respectively as described with reference to Figure 4. The two light beams from the shaped windows are horizontally incident on the two prisms 47 which deflect the beams vertically (as shown in Figure 10) to the two projection lenses 18, 19 respectively, the prisms 47 being horizontally adjustable in a direction at right angles to the adjustment of the two supporting frames 49 by thumb screws 77. Thus, each mirror 17 deflects the light horizontally through the adjacent shaped window 42 and thence through the corresponding masking apertures 13 or 14 to the associated prism 47 which directs the light vertically to the corresponding projection lens 18 or 19. The beams of light from the projection lenses 18, 19 remain fixed in direction relatively to the projector unit 10 and therefore relatively to the bottom of the press, and thus, in effect, serve to define an axis relatively to which the measured deflection takes place. The light interrupter or chopper 22 is in the form of a disc driven by the electric motor 23 and furnished with circumferentially spaced straight-sided openings, the chopper 22 being mounted to rotate so that the opening $22^1$ successively come into registration with each of the shaped windows 42 which are so formed as to impart the required sinusoidal wave form to the interrupted light. The chopper 22 thus periodically interrupts the light at a frequency, for example 1000 cycles per second, which is suitable for electrical amplification of the output of the photo-electric cells 24, 25 included in the upper or receiver unit 11 as hereinafter described.

The upper or receiver unit (Figures 11, 12 and 13) comprises a base 78 furnished with a flange 79 adapted to fit into the upper end of the hollow pillar B and carrying a lower sliding carriage 80 adjustable in guides 81 formed in the flanged base 78. An upper sliding carriage 82 is adjustable in guides 83 formed in the lower carriage 80 at right angles to the guides 81 formed in the base 78, hand wheels 84 being provided for adjusting the two carriages 80, 82 in their mutually perpendicular guides and clamps 85 for locking the carriages in their positions of adjustment. Suitable indicating scales (one of which is shown at 86) are also provided for indicating the positions of adjustment of the two sliding carriages 80, 82. The upper sliding carriage 82 is provided with two elongated receiving apertures 26, 27 laterally spaced apart. The light beams projected from the two projection lenses 48 of the lower or projector unit 10 are incident respectively on the two receiving apertures 26, 27, two mutually perpendicular edges of the images 20, 21 of the masking apertures 13, 14 (hereinafter referred to as knife-edges) extending across the receiving apertures respectively as described with reference to Figure 3. The light passes through each receiving aperture 26, 27 and thence through the receiving condenser lens 28 or 29 on to a partly transparent, partly reflecting mirror 30 or 31 arranged within a superstructure 87 carried by the upper sliding carriage 82. Part of the light from each receiving aperture 26, 27 passes through the transparent part of the corresponding mirror 30 or 31 to the associated photo-electric cell 24 or 25 carried by the said superstructure 87 whilst part of the light is deflected horizontally by the reflecting portion of the mirror to the eyepiece of a viewing microscope 32 or 33, arranged on one side of the superstructure 87. The two photo-electric cells 24, 25 are respectively connected to the two amplifiers 34, 35 arranged within a casing 88 forming part of the superstructure 87, the amplifiers 34, 35 being connected to the control desk as described above.

Since the nature of forging tools is such that the deflection is likely to be mainly in direction parallel to the sides of a rectangle joining the four pillars B of the press, the voltmeter scales are at right angles to each other and respectively indicate the deflections parallel to two mutually perpendicular sides of the said rectangle as above described.

A cylindrical field lens 45 (Figure 4) is arranged between each receiving condenser lens 28 or 29 and the corresponding photo-electric cell, with the axis of the cylindrical lens 45 parallel to the direction of measurement. The cylindrical field lens forms an image of the receiving aperture 26 or 27 on the corresponding photo-electric cell. The position of the patch of light on the cell is determined by the movement of the receiving unit 11 relatively to the projecting unit 10 whilst the width of the patch of light on the cell 24 or 25 is determined by the distance between the cell and the receiving condenser 28 or 29. At the image of the projection lens 18 or 19 (slightly beyond the associated photo-electric cell) the width of the light patch is constant and small compared with the movement of the image over the cell. Each cylindrical lens 45 is, however, arranged at such a distance from the corresponding receiving condenser 28 or 29 and from the image of the associated projection lens that the combined movement and change in width of the light patch on the cell are such that the patch expands or contracts symmetrically about its centre which therefore remains substantially stationary on the cell, thus minimising any effects due to non-uniformity of the sensitivity of the photo-electric cell. The size and position of the patch of light on the cell are determined by its position along the axis. In the direction of measurement the patch is of constant size at the image of the projection lens formed by the condenser, but moves along the cell by virtue of the movement of the receiver unit. Between this image and the condenser a plane can be found where the combined effect of the changing width of the beam and the movement of the image is such that although the patch changes in size, its centre remains constant in position relatively to the axis of the condenser. The cell is therefore mounted in this plane since errors due to non-uniformity of its surface are thereby minimised. In the direction at right angles the patch is defined as the image of the receiving aperture formed by the cylindrical lens, and is constant in size and position.

When the upper unit 11 has been adjusted by means of the hand wheels 84 so that the scales 86 read zero, the beams from the lower unit 10 must be adjusted properly to cross the receiving apertures 26, 27 by means of the adjusting screws 76, 77. These screws, which are graduated in arbitrary units to facilitate adjustment, can be manipulated after the clamping bolts 76 have been slacked off. The proper position for the functional edge of each image 20, 21 along the associated receiving aperture 26 or 27 is marked by a pointer 90 which extends into a small opening 91 alongside the centre of each of the apertures 26 and 27. Each of the light images 20 and 21 should just touch the tip of the associated pointer as shown in Figure 14. One edge of each of the apertures 13, 14 has a V-notch which produces in the projected image a similar V-notch 92 for facilitating general centralisation of the image with respect to the corresponding receiving aperture. If the notch 92 is not at first visible (through the associated miscroscope 32 or 33) the adjusting screws 76 and 77 should be manipulated until the notch comes into view. The notch 92 marks the centre of the functional side of each beam and is provided to ensure that the beam extends for enough beyond the aperture 26 or 27 to cover the fullest deflection of the head A of the press.

After adjustment the lengthwise position of the functional edge of each image 20, 21 is not exactly in the centre of the corresponding aperture 26 or 27, nor is the end graduation of each voltmeter scale 36, 37 at the true zero of the voltmeter. In the example shown in Figure 14 each pointer 90 is so positioned that the length 93 is approximately 9/11 of the whole length of the aperture. This is to prevent the light transmitted through the receiving aperture from falling to zero at full deflection, thereby ensuring that there is sufficient pressure on the contacts of the relay 38, 39 or 40 to close the circuit of the bell relay 52 even at the extreme end of the range. If the light transmitted through the aperture 26 or 27 fell to zero the contact of the relay 38, 39 or 40 would have to close for zero deflection of the relay in which position no force at all could be exerted on the relay contact.

If after adjustment both the voltmeter scales 36, 37 do not accurately read zero the scales may be brought to zero (or nominal zero) by adjustment of the two amplifiers 34, 35. If desired the control desk 12 may be provided with independent means for bringing the voltmeter scales to the initial zero reading. For testing the performance of the apparatus the cross slides or carriages 80, 82 (Figures 11 and 12) can be adjusted so as, in effect, to simulate deflection of the head A, when the readings on the slide scales 86 should tally with those on the voltmeter scales 36, 37.

The amplifiers 34, 35 include two stages of amplification by triode valves and a 3-watt triode output valve. Resistance capacity coupling is conveniently used between the amplifying valves, and a parallel-fed transformer couples the second stage with the output valve to which two voltmeters 94 are matched by means of a double-wound output transformer. The amplifier output is preferably adjusted by means of a gain control and, to cover small secular changes, a small variable series resistance may be provided at a control point.

It will be seen that owing to the wide separations of parts of a reciprocating press and of the need for avoiding restriction of the space around the press, i. e. on the press platform, satisfactory projection of the deflection on to a screen arranged on the press platform is not practicable. This difficulty is, however, overcome by the invention which obviates the necessity for optical connection between the platform and the press proper since the light beam or beams can extend parallel to the direction of the reciprocation, e. g. through one of the hollow guide pillars B.

Instead of the knife-edges being constituted by two mutually perpendicular edges of two apertures associated respectively with the two projection apertures so that two beams of light are transmitted to the two receiving apertures 26, 27 respectively as above described, the two knife-edges may be constituted by two mutually perpendicular edges 101, 102 of a single aperture 100 as shown in Figure 15, the aperture 100 lying within the field of a single projector objective 103 so that a single beam of light is transmitted to the two receiving apertures 104, 105 which are then conveniently laterally spaced apart in two directions at right angles to each other.

Further, instead of the light interrupter and projection objectives being arranged on the lower or projection unit, with the receiving apertures and cells on the upper or receiver unit, the projection objectives 111, 112 (Figure 16) may be carried by the upper or receiver unit which also carries the photo-electric cells 24, 25 and the light interrupter 22. With this arrangement the light source 15¹ carried by the lower unit, is imaged by two condenser lenses 113, 114 on two field lenses 115 respectively which are in turn imaged respectively on the two projection objectives 111, 112 by two lenses 116 arranged on the projection unit adjacent to two rectangular apertures 117 each of which has a length equal to the maximum deflection to be measured. The image formed on each projection objective 111 is large enough to fill the objective with light even at maximum relative displacement of the two associated parts. Each objective 111, 112 forms an image of the aperture 117 on a knife-edge conveniently constituted by the edge of a reflector 120. This reflector is conveniently formed as a partly transparent, partly reflecting interface of two right-angled prisms cemented together. The dividing line between the clear and reflective positions nominally bisects the image of the aperture 117 in the no deflection position, the light through the clear portion proceeding to the cells 24, 25 and the reflected portion to observing microscopes 32, 33. Between the knife-edge and the cell are mounted the chopper 22, a second objective 118, two field lenses 121 and 122, and, adjacent to the chopper, a mask 119. The objective 118 forms an image of the knife-edge on the field lens 121 and the field lens forms an image of the mask 119 and chopper adjacent to the objective 111 and the photocell. The mask 119, which may be replaced by a mask 123, has a sinusoidal opening. As before, a little more than half the aperture 117 is preferably received in the no deflection position, to avoid zero current through the relay at the end of the range of movement.

Thus, since the projection objectives 111, 112, knife-edges and cells 24, 25 are all carried by one and the same part and therefore move together as a unit, the patch of light on each cell 24, 25 will be maintained substantially constant in size and position and will only vary in brightness in accordance with the degree of relative movement or deflection of the upper and lower units.

It will be appreciated that though the invention has been described as applied to the measurement and indication of strains arising in a vertical reciprocataing press, the invention may be employed for indicating relative lateral movements or deflections of any two associated parts whether separately carried or constituting parts of one and the same element. For example, the invention may be employed wherever bending or torsional stresses take place, say, between two parts of a single element such for example as a beam, strut or shaft.

What I claim as my invention and desire to secure by Letters Patent is:

1. In apparatus for measuring relative lateral movements or deflections of two associated parts, such for example as the upper and lower parts of a reciprocating press, in combination, two pairs of elements, one element of each pair being constituted by a knife-edge and the other by an aperture, means for projecting an image of one element of each pair on to the other element of the pair, two photo-electric cells respectively associated with the two pairs of elements, and measuring means controlled by the cells, relative movement of the two associated parts in either of two coordinate directions causing corresponding relative movement of the two elements of one pair so as to vary the light incident on the corresponding cell whereby the two cells are energised respectively in accordance with relative movement of the two associated parts in the two coordinate directions.

2. In apparatus for measuring relative lateral movements or deflections of two associated parts, such for example as the upper and lower parts of a reciprocating press, in combination, two pairs of elements, one element of each pair being constituted by a knife-edge and the other by an aperture, the knife-edges being constituted by two mutually perpendicular edges of two masking openings, means for projecting an image of one element of each pair on to the other element of the pair, two photo-electric cells respectively associated with the two pairs of elements, and measuring means controlled by the cells, relative movement of the two associated parts in either of two coordinate directions causing corresponding relative movement of the two elements of one pair so as to vary the light incident on the corresponding cell whereby the two cells are energized respectively in accordance with relative movement of the two associated parts in the two coordinate directions.

3. In apparatus for measuring relative lateral movements or deflections of two associated parts, such for example as the upper and lower parts of a reciprocating press, in combination, two pairs of elements, one element of each pair being constituted by a knife-edge on one of the said parts and the other by an aperture in the second of the said parts, optical projection means carried by the first of the said parts and which projects images of the knife-edges respectively across the associated apertures in the second of the said parts, two photo-electric cells carried by the second of said parts and associated respectively with said aperture therein, and measuring means controlled by the cells, relative movement of the two parts in either of two coordinate directions causing corresponding relative movement of one knife-edge and its associated aperture so as to vary the light incident on the corresponding cell whereby the two cells are energised respectively in accordance with relative movement of the two associated parts in the two coordinate directions.

4. In apparatus for measuring relative lateral movements or deflections of two associated parts, such for example as the upper and lower parts of a reciprocating press, in combination, two pairs of elements, one element of each pair being constituted by a knife-edge on one of the said associated parts and the other element by an aperture in the second of the associated parts, the knife-edges being constituted by two mutually perpendicular edges of two masking openings in the first of said parts, optical projection means carried by the first of the said parts and which projects images of the knife-edges respectively across the associated apertures in the second of the said parts, two photo-electric cells carried by the second of said parts and associated respectively with said apertures therein, and measuring means controlled by the cells, relative movement of the two parts in either of two coordinate directions causing corresponding relative movement of one knife-edge and its associated aperture so as to vary the light incident on the corresponding cell whereby the two cells are energised respectively in accordance with relative movement of the two associated parts in the two coordinate directions.

5. In apparatus for measuring relative lateral movements or deflections of two associated parts, such for example as the upper and lower parts of a reciprocating press, in combination, two pairs of elements, one element of each pair being constituted by a knife-edge and the other by an aperture, the knife-edges being constituted by two mutually perpendicular edges of a single masking opening in one of the said associated parts, means for projecting an image of one element of each pair on to the other element of the pair, two photo-electric cells respectively associated with the two pairs of elements, and measuring means controlled by the cells, relative movement of the two associated parts in either of two coordinate directions causing corresponding relative movement of the two elements of one pair so as to vary the light incident on the corresponding cell whereby the two cells are energised respectively in accordance with relative movement of the two associated parts in the two coordinate directions.

6. In apparatus for measuring relative lateral movements or deflections of two associated parts, such for example as the upper and lower parts of a reciprocating press, in combination, two pairs of elements, one element of each pair being constituted by a knife-edge on one of the said parts and the other by an aperture in the second of the said parts, the knife-edges being constituted by two mutually perpendicular edges of a single masking opening in the first of the said associated parts, optical projection means carried by the first of the said parts and which projects images of the knife-edges respectively across the associated apertures in the second of the said parts, two photo-electric cells carried by the second of said parts and associated respectively with said apertures therein, and measuring means controlled by the cells, relative movement of the two parts in either of two coordinate directions causing corresponding relative movement of one knife-edge and its associated aperture so as to vary the light incident on the corresponding cell whereby the two cells are energised respectively in accordance with relative movement of the two associated parts in the two coordinate directions.

7. In apparatus for measuring relative lateral movements or deflections of two associated parts, such for example as the upper and lower parts of a reciprocating press, in combination, two pairs of elements, one element of each pair being constituted by a knife-edge on one of the said parts and the other by an aperture in the second of the said parts, optical projection means carried by the first of the said parts and which projects images of the knife-edges respectively across the associated apertures in the second of the said parts, two photo-electric cells carried by the second of said parts and associated respectively with said apertures therein, measuring means controlled by the cells, relative movement of the two parts in either of two coordinate directions causing corresponding relative movement of one knife-edge and its associated aperture so as to vary the light incident on the corresponding cell whereby the two cells are energised respectively in accordance with relative movement of the two associated parts in the two coordinate directions, and means for relatively adjusting the knife-edges in two mutually perpendicular directions for the purpose of initially positioning the knife-edge images with respect to the associated apertures.

8. In apparatus for measuring relative lateral movements or deflections of two associated parts, such for example, as the upper and lower parts of a reciprocating press, in combination, two pairs of elements, one element of each pair being constituted by a knife-edge on one of the said associated parts and the other element by an aperture in the second of the associated parts, the knife-edges being constituted by two mutually perpendicular edges of two masking openings in the first of said parts, optical projection means carried by the first of the said parts and which projects images of the knife-edges respectively across the associated apertures in the second of the said parts, two photo-electric cells carried by the second of said parts and associated respectively with said apertures therein, measuring means controlled by the cells, relative movement of the two parts in either of two coordinate directions causing corresponding relative movement of one knife-edge and its associated aperture so as to vary the light incident on the corresponding cell whereby the two cells are energised respectively in accordance with relative movement of the two associated parts in the two coordinate directions, and means for relatively adjusting the knife-edges in two mutually perpendicular directions for the purpose of initially positioning the knife-edge images with respect to the associated apertures.

9. In apparatus for measuring relative lateral movements or deflections of two associated parts, such for example as the upper and lower parts of a reciprocating press, in combination, two pairs of elements, one element of each pair being constituted by a knife-edge on one of the said associated parts and the other element by an aperture in the second of the associated parts, the knife-edges being constituted by two mutually perpendicular edges of two masking openings in the first of said parts, each of said two mutually perpendicular edges having a notch therein, optical projection means carried by the first of the said parts and which projects images of the knife-edges respectively across the associated apertures in the second of the said parts, two photo-electric cells carried by the second of said parts and associated respectively with said apertures therein, measuring means controlled by the cells, relative movement of the two parts in either of two coordinate directions causing corresponding relative movement of one knife-edge and its associated aperture so as to vary the light incident on the corresponding cell whereby the two cells are energised respectively in accordance with relative movement of the two associated parts in the two coordinate directions, and means for relatively adjusting the knife-edges in two mutually perpendicular directions for the purpose of initially positioning the knife-edge images with respect to the associated apertures, the said notches, as reproduced in the projected images, serving as datums for facilitating said initial positioning.

10. In apparatus for measuring relative lateral movements or deflections of two associated parts, such for example as the upper and lower parts of a reciprocating press, in combination, two pairs of elements, one element of each pair being constituted by a knife-edge on one of the said associated parts and the other element by an aperture in the second of the associated parts, the knife-edges being constituted by two mutually perpendicular edges of two masking openings in the first of said parts, each of said two mutually perpendicular edges having a notch therein, optical projection means carried by the first of the said parts and which projects images of the knife-edges respectively across the associated apertures in the second of the said parts, two photo-electric cells carried by the second of said parts and associated respectively with said apertures therein, measuring means controlled by the cells, relative movement of the two parts in either of two coordinate directions causing corresponding relative movement of one knife-edge and its associated aperture so as to vary the light incident on the corresponding cell whereby the two cells are energised respectively in accordance with relative movement of the two associated parts in the two coordinate directions, the second of the said two associated parts having two datum windows respectively adjacent to the two apertures where these are intersected by the knife-edge images at zero setting of the apparatus, and means for relatively adjusting the knife-edges in two mutually perpendicular directions for the purpose of initially positioning the knife-edge images with respect to the associated apertures, the said windows, and the notches as reproduced in the projected images, serving as datums for facilitating the said initial positioning.

11. In apparatus for measuring relative lateral movements or deflections of two associated parts, such for example as the upper and lower parts of a reciprocating press, in combination, two pairs of elements, one element of each pair being constituted by a knife-edge on one of the said parts and the other by an aperture in the second of the said parts, optical projection means carried by the first of the said parts and which projects images of the knife-edges respectively across the associated apertures in the second of the said parts, two photo-electric cells carried by the second of said parts and associated respectively with said apertures therein, two partly transmitting and partly reflecting mirrors, one arranged between each photo-electric cell and the optical projection means, means for observing the light image transmitted by the said mirrors, and measuring means controlled by the cells, relative movement of the two parts in either of two coordinate directions causing corresponding relative movement of one knife-edge and its associated aperture so as to vary the light incident on the corresponding cell whereby the two cells are energised respectively in accordance with relative movement of the two associated parts in the two coordinate directions.

12. In apparatus for measuring relative lateral movements or deflections of two associated parts, such for example as the upper and lower parts of a reciprocating press, in combination, two pairs of elements, one element of each pair being constituted by a knife-edge on one of the said associated parts and the other element by an aperture in the second of the associated parts, the knife-edges being constituted by two mutually perpendicular edges of two masking openings in the first of said parts, each of said two mutually perpendicular edges having a notch therein, optical projection means carried by the first of the said parts and which projects images of the knife-edges respectively across the associated apertures in the second of the said parts, two photo-electric cells carried by the second of said parts and associated respectively with said apertures therein, measuring means controlled by the cells, relative movement of the two parts in either of two coordinate directions causing corresponding relative movement of one knife-edge and its associated aperture so as to vary the light incident on the corresponding cell whereby the two cells are energised respectively in accordance with relative movement of the two associated parts in the two coordinate directions, the second of the said two associated parts having two datum windows respectively adjacent to the two apertures where these are intersected by the knife-edge images at zero setting of the apparatus, means for relatively adjusting the knife-edges in two mutually perpendicular directions for the purpose of initially positioning the knife-edge images with respect to the associated apertures, the said windows, and the notches as reproduced in the projected images, serving as datums for initially positioning the images relatively to said apertures, two partly transmitting and partly reflecting mirrors, one arranged between each photo-electric cell and the optical projection means, and means for observing the light image transmitted by the said mirrors.

13. In apparatus for measuring relative lateral movements or deflections of two associated parts, such for example as the upper and lower parts of a reciprocating press, in combination, two pairs of elements, one element of each pair being constituted by an aperture in one of the two associated parts and the other by a knife-edge in the second of the two associated parts, optical projection means carried by said first part and which projects images of said apertures on to the knife-edges so that the knife-edges on the second part extend respectively across the two aperture images, two photo-electric cells carried by the second part and associated respectively with the two knife-edges, and measuring means controlled by the cells, relative movement of the two associated parts in either of two coordinate directions causing corresponding relative movement of one aperture image and its associated knife-edge so as to vary the light incident on the corresponding cell whereby the two cells are energised respectively in accordance with relative movement of the two associated parts in the two coordinate directions.

14. Apparatus as claimed in claim 13, in which each knife-edge is constituted by the junction between the reflecting and transmitting portions of a partly reflecting partly transmitting mirror arranged between the corresponding photo-electric cell and the optical projecting means, the reflecting portion of the mirror deflecting part of the light transversely to means for observing the transmitted light image.

15. In apparatus for measuring relative lateral movements or deflections of two associated parts, such for example as the upper and lower parts of a reciprocating press, in combination, two pairs of elements, one element of each pair being constituted by a knife-edge and the other by an aperture, means for projecting an image of one element of each pair on to the other element of the pair, two photo-electric cells respectively associated with the two pairs of elements, two measuring devices whose scales are graduated in two mutually perpendicular directions, and means whereby the two measuring devices are controlled respectively by the two photo-electric cells, relative movement of the two associated parts in either of two coordinate directions causing corresponding relative movement of the two elements of one pair so as to vary the light incident on the corresponding cell whereby the two cells and the two measuring devices are energised respectively in accordance with relative movement of the two associated parts in the two coordinate directions.

16. In apparatus for measuring relative lateral movements or deflections of two associated parts, such for example as the upper and lower parts of a reciprocating press, in combination, two pairs of elements, one element of each pair being constituted by a knife-edge on one of the said associated parts and the other element by an aperture in the second of the associated parts, the knife-edges being constituted by two mutually perpendicular edges of two masking openings in the first of said parts, optical projection means carried by the first of the said parts and which projects images of the knife-edges respectively across the associated apertures in the second of the said parts, two photo-electric cells carried by the second of said parts and associated respectively with said apertures therein, two measuring devices whose scales are graduated in two mutually perpendicular directions, and means whereby the two measuring devices are controlled respectively by the two photo-electric cells, relative movement of the two parts in either of two coordinate directions causing corresponding relative movement of one knife-edge and its associated aperture so as to vary the light incident on the corresponding cell whereby the two cells and measuring devices are energised respectively in accordance with relative movement of the two associated parts in the two coordinate directions.

17. In apparatus for measuring relative lateral movements or deflections of two associated parts, such for example as the upper and lower parts of a reciprocating press, in combination, two pairs of elements, one element of each pair being constituted by a knife-edge and the other by an aperture, means for projecting an image of one element of each pair on to the other element of the pair, two photo-electric cells respectively associated with the two pairs of elements, a light interrupter which effects sinusoidal interruption of the light incident on each cell, two measuring devices, and two amplifiers through which the photo-electric cells control the measuring devices respectively, relative movement of the two associated parts in either of two coordinate directions causing corresponding relative movement of the two elements of one pair so as to vary the light incident on the corresponding cell whereby the two cells and measuring devices are energised respectively in accordance with relative movement of the two associated parts in the two coordinate directions.

18. In apparatus for measuring relative lateral movements or deflections of two associated parts, such for example as the upper and lower parts of a reciprocating press, in combination, two pairs of elements, one element of each pair being constituted by a knife-edge on one of the said associated parts and the other element by an aperture in the second of the associated parts, the knife-edges being constituted by two mutually perpendicular edges of two masking openings in the first of said parts, optical projection means carried by the first of the said parts and which projects images of the knife-edges respectively across the associated apertures in the second of the said parts, two photo-electric cells carried by the second of said parts and associated respectively with said apertures therein, a light interrupter which effects sinusoidal interruption of the light incident on each cell, two measuring devices whose scales are graduated in two mutually perpendicular directions, and two amplifiers through which the photo-electric cells control the measuring devices respectively, relative movement of the said two associated parts in either of two coordinate directions causing corresponding relative movement of one knife-edge and its associated aperture so as to vary the light incident on the corresponding cell whereby the two cells and the corresponding measuring devices are energised in accordance with relative movement of the two associated parts in the two coordinate directions.

19. In apparatus for measuring relative lateral movements or deflections of two associated parts, such for example as the upper and lower parts of a reciprocating press, in combination, two pairs of elements, one element of each pair being constituted by a knife-edge and the other by an aperture, means for projecting an image of one element of each pair on to the other element of the pair, two photo-electric cells respectively associated with the two pairs of elements, a light interrupter which effects sinusoidal interruption of the light incident on each cell, said interrupter and the projection objectives of the projecting means being arranged on one of the said associated parts whilst the photo-electric cells are arranged on the second of the said associated parts, a cylindrical lens on the said second part in the light beam incident on each photo-electric cell, the cylindrical lens tending to maintain constant the position of the patch of light on the cell irrespective of relative movements of the two associated parts, two measuring devices and two amplifiers through which the photo-electric cells control the measuring devices respectively, relative movement of the two associated parts in either of two coordinate directions causing corresponding relative movement of the two elements of one pair so as to vary the light incident on the corresponding cell whereby the two cells and measuring devices are energised respectively in accordance with relative movement of the two associated parts in the two coordinate directions.

20. In apparatus for measuring relative lateral movements or deflections of two associated parts, such for example as the upper and lower parts of a reciprocating press, in combination, two pairs of elements, one element of each pair being constituted by a knife-edge and the other by an aperture, means for projecting an image of one element of each pair on to the other element of the pair, two photo-electric cells respectively associated with the two pairs of elements, a light interrupter which effects sinusoidal interruption of the light incident on each cell, said cells, interrupter and the projection objectives of the projecting means being arranged on one of the said two associated parts, the size and position of the patch of light on each cell being maintained constant irrespective of relative movements of the two associated parts, two measuring devices, and two amplifiers through which the photo-electric cells control the measuring devices respectively, relative movement of the two associated parts in either of two co-ordinate directions causing corresponding relative movement of the two elements of one pair so as to vary the light incident on the corresponding cell whereby the two cells and measuring devices are energised respectively in accordance with relative movement of the two associated parts in the two coordinate directions.

21. In apparatus for measuring relative lateral movements or deflections of two associated parts, such for example as the upper and lower parts of a reciprocating press, in combination, two pairs of elements, one element of each pair being constituted by a knife-edge and the other by an aperture, means for projecting an image of one element of each pair on to the other element of the pair, two photo-electric cells respectively associated with the two pairs of elements, and measuring means controlled by the cells including an indicating device, relative movement of the two associated parts in either of two coordinate directions causing corresponding relative movement of the two elements of one pair so as to vary the light incident on the corresponding cell whereby the two cells are energised respectively in accordance with relative movement of the two associated parts in the two coordinate directions, a predetermined degree of lateral relative movement of the two associated parts causing operation of the indicating device.

22. In apparatus for measuring relative lateral movements or deflections of two associated parts, such for example as the upper and lower parts of a reciprocating press, in combination, two pairs of elements, one element of each pair being constituted by a knife-edge on one of the said associated parts and the other element by an aperture in the second of the associated parts, the knife-edges being constituted by two mutually perpendicular edges of two masking openings in the first of said parts, optical projection means carried by the first of the said parts and which projects images of the knife-edges respectively across the associated apertures in the second of the said parts, two photo-electric cells carried by the second of said parts and associated respectively with said apertures therein, two measuring devices whose scales are graduated in two mutually perpendicular directions, and means whereby the two measuring devices are controlled respectively by the two photo-electric cells, relative movement of the two parts in either of two coordinate directions causing corresponding relative movement of one knife-edge and its associated aperture so as to vary the light incident on the corresponding cell whereby the two cells and measuring devices are energised respectively in accordance with relative movement of the two associated parts in the two coordinate directions, and an indicating device controlled by said measuring devices, a predetermined deflection of either measuring device causing operation of the indicating device.

23. In apparatus for measuring relative lateral movements or deflections of two associated parts, such for example as the upper and lower parts of a reciprocating press, in combination, two pairs of elements, one element of each pair being constituted by a knife edge and the other by an aperture, means for projecting an image of one element of each pair on to the other element of the pair, two photo-electric cells respectively associated with the two pairs of elements, measuring means controlled by the cells, relative movement of the two associated parts in either of two coordinate directions causing corresponding relative movement of the two elements of one pair so as to vary the light incident on the corresponding cell whereby the two cells are energised respectively in accordance with relative movement of the two associated parts in the two coordinate directions, and an indicating device controlled by both the said cells through control apparatus comprising two indicating control relays energised from the two cells respectively and a third indicating control relay connected between corresponding ends of the first two relays so that the magnitude of the relative movement of the said two associated parts necessary to operate the indicating device is approximately the same whatever the direction of the said movement.

24. In apparatus for measuring relative lateral movements or deflections of two associated parts, such for example as the upper and lower parts of a reciprocating press, in combination, two pairs of elements, one element of each pair being constituted by a knife-edge on one of the said associated parts and the other element by an aperture in the second of the associated parts, the knife edges being constituted by two mutually perpendicular edges of two masking openings in the first of said parts, optical projection means carried by the first of the said parts and which projects images of the knife-edges respectively across the associated apertures in the second of the said parts, two photo-electric cells carried by the second of said parts and associated respectively with said apertures therein, a light interrupter which effects sinusoidal interruption of the light incident on each cell, said interrupter being disposed in or near the image plane of the corresponding projection objective, two measuring devices whose scales are graduated in two mutually perpendicular directions, two amplifiers through which the photo-electric cells control the measuring devices respectively, relative movement of the said two associated parts in either of two coordinate directions causing corresponding relative movement of one knife-edge and its associated aperture so as to vary the light incident on the corresponding cell whereby the two cells and the corresponding measuring devices are energised in accordance with relative movement of the two associated parts in the two coordinate directions, and an indicating device controlled from the outputs of both amplifiers through control apparatus comprising two rectifiers connected across the output sides of the amplifiers, two indicating control relays connected across the output sides of the rectifiers, and a third indicating relay connected between corresponding ends of the first two relays, the impedance of the third relay being twice that of each of the other two relays so that the magnitude of the relative movement of the said two associated parts necessary to operate the indicating device is approximately the same whatever the direction of the said movement.

25. In apparatus for measuring relative movements or deflections of two associated parts, the combination of two photo-electric cells, two optical systems for energizing the two cells in accordance respectively with two coordinate components of the relative movement to be measured, means operated by the cells for indicating the two components, an alarm device, and control means whereby the cells cause the alarm device to give an alarm when the resultant of the two components of the relative movement exceeds a predetermined value.

26. Apparatus as claimed in claim 25, in which the control means comprises two relays respectively energized from the two cells, a third relay connected between corresponding ends of said two relays, and means whereby the alarm device will give an alarm in response to operation of any one of the three relays, the impedance of the third relay being at least twice that of each of the other two relays.

27. For use in apparatus for measuring relative movements or deflections of two associated parts, an optical system for energizing a photo-electric cell in accordance with a relative movement to be measured, comprising two elements carried respectively by the two associated parts and constituted respectively by a knife edge and by an aperture, means for projecting an image of one element on to the other element so that the amount of light incident on the cell will be varied in accordance with the relative movement to be measured and means for relatively adjusting the two elements for initial setting purposes, the knife edge having a notch therein whose image serves as a datum for such initial setting.

28. For use in apparatus for measuring relative movements or deflections of two associated parts, an optical system for energizing a photo-electric cell in accordance with a relative movement to be measured, comprising two elements carried respectively by the two associated parts and constituted respectively by a knife edge and by an aperture, means for projecting an image of one element on to the other element so that the amount of light incident on the cell will be varied in accordance with the relative movement to be measured, and means for relatively adjusting the two elements in two mutually perpendicular directions for initial setting purposes, the knife edge having a notch therein and the aperture having an index window associated therewith, the said notch and window each serving as a datum for such initial setting.

29. For use in apparatus for measuring relative movements or deflections of two associated parts, an optical system for energizing a photo-electric cell in accordance with a relative movement to be measured, comprising two elements carried respectively by the two associated parts and constituted respectively by a knife edge and by an aperture, means for projecting an image of one element on to the other element so that the amount of light incident on the cell will be varied in accordance with the relative movement to be measured, a partially transparent mirror located between the photo-electric cell and the optical system, and means for observing with the aid of said mirror the imaging of one element on the other.

30. In the apparatus for measuring relative movements or deflections of two associated parts, the combination of a knife edge carried by the first of said parts, an aperture carried by the second of said parts, an optical projecting device carried by the first part and acting to project an image of the knife edge on to the aperture, a photo-electric cell carried by the second part, the light incident on the cell being controlled in accordance with the relative movement of the aperture and the image of the knife edge, measuring means controlled by the cell, means for relatively adjusting the knife edge and the aperture in two mutually perpendicular directions for initial setting purposes, a partially transparent mirror located between the aperture and the photo-electric cell, and means for observing with the aid of said mirror the imaging of the knife edge on the aperture.

31. Apparatus as claimed in claim 30, in which the knife edge is provided with a notch, and the aperture has associated with it an index window, the notch and the index window as seen through the observing means each serving as a datum for the initial setting by the adjusting means.

32. In apparatus for measuring relative movements or deflections of two associated parts, the combination of an aperture carried by the first of the said two parts, a knife edge carried by the second of the two parts and constituted by the junction of the reflecting and transmitting portions of a partially transparent mirror, an optical projecting device carried by the second part and acting to project an image of the aperture on to the knife edge, a photo-electric cell carried by the second part, the light incident on the cell being controlled in accordance with the relative movement of the knife edge and the image of the aperture, measuring means controlled by the cell, and means for observing with the aid of the partially transparent mirror the imaging of the aperture on the knife edge.

33. In apparatus for measuring relative movements or deflections of two associated parts, the combination of two elements carried respectively by the two said parts and constituted respectively by a knife edge and by an aperture, an optical projecting device for projecting an image of one element on to the other element, a photo-electric cell, the light incident on which is controlled in accordance with the relative movement of the two elements, a light interrupter which effects sinusoidal interruption of the light incident on the photo-electric cell, an amplifier for amplifying the electrical output of the cell, and measuring means controlled by the amplified output of the cell for indicating the relative movement between the two associated parts.

34. In apparatus for measuring relative movements or deflections of two associated parts, the combination of a knife edge carried by the first of said parts, an aperture carried by the second of said parts, an optical projecting device carried by the first part and acting to project an image of the knife edge on to the aperture, a photo-electric cell carried by the second part, the light incident on the cell being controlled in accordance with the relative movement of the aperture and the image of the knife edge, a light interrupter carried by the first part and acting to effect sinusoidal interruption of the light incident on the cell, an amplifier for amplifying the electrical output of the cell, and measuring means controlled by the amplified output of the cell for indicating the relative movement between the two associated parts.

35. Apparatus as claimed in claim 33, in which the optical projection device, the photo-electric cell, the light interrupter and one of the two elements are all carried by one of the two associated parts, while the second element is carried by the other part, whereby the patch of light on the cell is maintained substantially constant in size and position but varies in brightness in accordance with the relative movement to be measured.

36. In apparatus for measuring relative movements or deflections of two associated parts, the combination of the two elements carried respectively by the two said parts and constituted respectively by a knife edge and by an aperture, an optical projecting device carried by one of the two parts for projecting an image of one element on to the other element, a photo-electric cell carried by the other of the two parts the light incident on the cell being controlled in accordance with the relative movement between the two elements, a cylindrical lens located in the path of the light incident on the cell and acting to maintain substantially constant the position of the patch of light on the cell and measuring means controlled by the cell for indicating the relative movement between the two associated parts.

37. The combination set forth in claim 30, of a cylindrical lens located in the path of the light incident on the photo-electric cell and acting to maintain substantially constant the position of the patch of light on the cell.

38. The combination set forth in claim 34, of a cylindrical lens located in the path of the light incident on the photo-electric cell and acting to maintain substantially constant the position of the patch of light on the cell.

RICHARD EDMUND REASON.